(12) United States Patent
Tehan

(10) Patent No.: US 6,201,956 B1
(45) Date of Patent: Mar. 13, 2001

(54) VOICE MAIL BASED BILLING DELIVERY SYSTEM

(75) Inventor: Tony Tehan, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/159,583

(22) Filed: Sep. 24, 1998

(51) Int. Cl.[7] .................................................. H04M 11/00
(52) U.S. Cl. .......................... 455/406; 455/413; 379/114; 379/126; 379/134
(58) Field of Search .................................... 455/406, 407, 455/408, 405, 412, 413, 422, 507, 575; 379/111–114, 115, 133, 134, 126

(56) References Cited

U.S. PATENT DOCUMENTS

| 5,195,126 | 3/1993 | Carrier et al. ......................... 379/45 |
| 5,329,573 | * 7/1994 | Chang et al. ......................... 455/413 |

FOREIGN PATENT DOCUMENTS

| 606041 | 7/1994 | (EP) . |
| 63/020948 | 1/1988 | (JP) . |
| 1/125055 | 5/1989 | (JP) . |
| 9/321880 | 12/1997 | (JP) . |

OTHER PUBLICATIONS

European Search Report re RS 101986 Date of mailing of search: Mar. 18, 1999.

* cited by examiner

Primary Examiner—Doris H. To
(74) Attorney, Agent, or Firm—Burns, Doane, Swecker & Mathis, L.L.P.

(57) ABSTRACT

A method and system for the delivering bills to subscribers of wireless telecommunication services, and the subsequent retrieval of the same, using a voice mail system is disclosed. In an aspect of the invention, a bill is generated from billing information obtained from a billing center containing the call details of individual subscribers. The generated bill is translated into a format comprising synthesized speech message describing the bill specifics. Alternatively, the bill may be translated into a computer readable file capable of being downloading by a computer. The translated bill is stored in the subscriber's voice mailbox following which, a notification is sent to the subscriber to indicate its arrival. The bill can be subsequently retrieved by the subscriber by accessing the voice mailbox with either a phone or a computer. The invention permits cost effective and timely delivery of bills without having to rely on a third party for delivery. Moreover, the subscriber is able to attain access to their bill from any location.

20 Claims, 4 Drawing Sheets

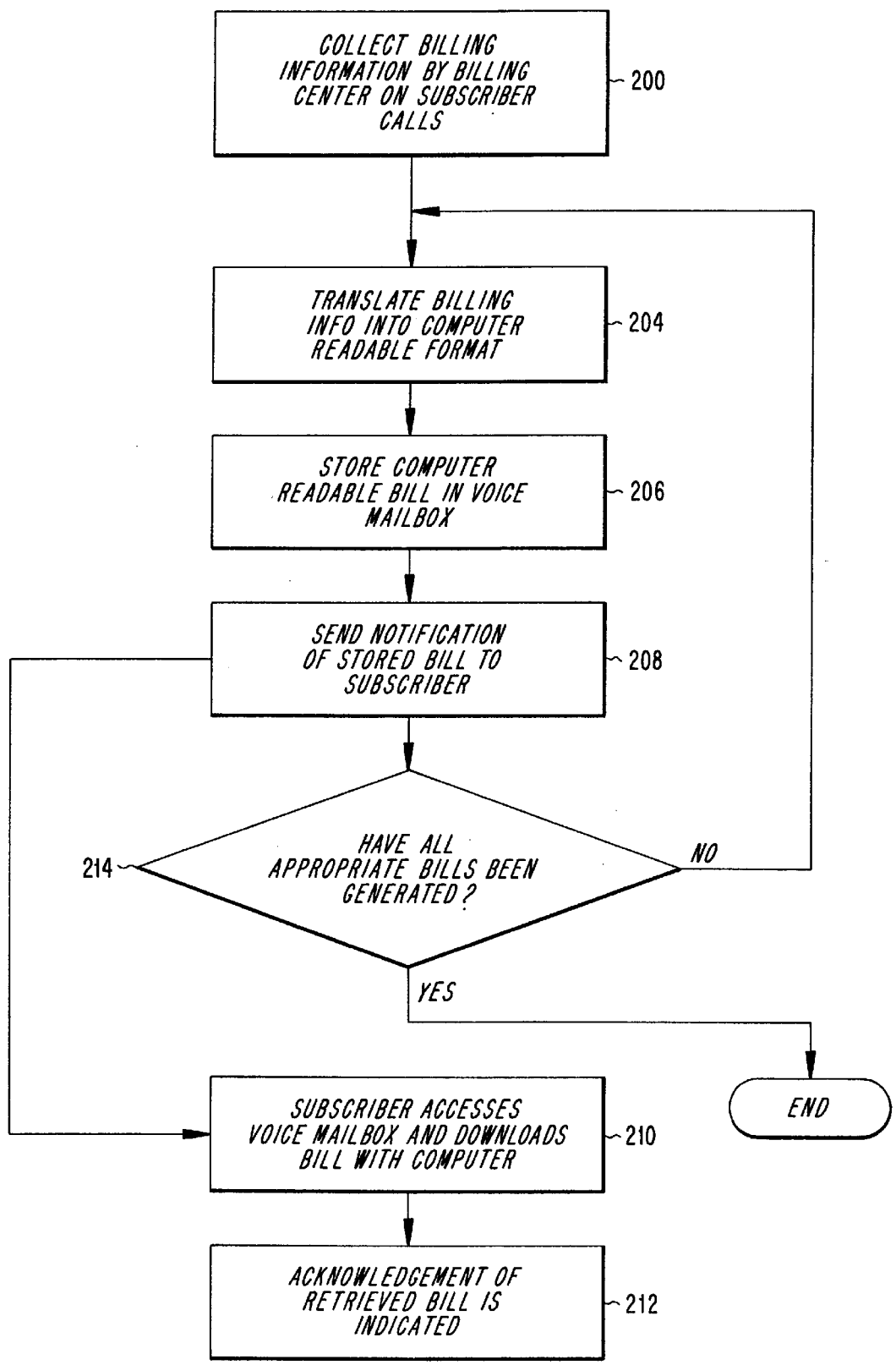

VOICE MAIL BASED BILLING DELIVERY SYSTEM

FIELD OF THE INVENTION

The present invention relates generally to billing systems and more specifically, it relates to a billing system for wireless telecommunication services using voice mail systems.

BACKGROUND OF THE INVENTION

The tremendous growth of wireless telecommunication services has led to an increasingly competitive environment that has prompted operators to intensify the search for areas in which to cut costs. One area that may be suitable for cost reduction is in the conventional procedure for billing subscribers for wireless telecommunication services. In the typical conventional billing method, network providers generally must collect billing information containing the detailed calling data of subscribers to generate a bill which is then printed on paper, packaged and sorted in order to be sent to the subscriber through the postal system. For a network provider that must provide billing to hundreds of thousands of subscribers or more on a periodic basis, the billing process may represent a significant portion of its operating expenses.

Billing by conventional means have other drawbacks. For example, it relies on a third party for delivery thus the sender is generally not absolutely certain that the subscriber has received his/her bill. Furthermore, a delay of several days is typically incurred when using the postal system thus subscribers are not able to access to their bill unit it has arrived by mail. This can be inconvenient when subscribers are away for extended periods of time, for example, and therefore they typically do not have access to their bills until they return. Another consideration with the paper billing format is that it is cumbersome and requires subscribers manually sort through their bills not to mention the high cost of using enormous amounts of paper for printing bills on a regular basis.

In view of the foregoing, it is an objective of the present invention to provide a method and system for delivering bills in a cost effective and timely manner without having to rely on a third party for delivery.

SUMMARY OF THE INVENTION

Briefly described, and in accordance with embodiments thereof, the invention discloses a method and system for delivering bills to subscribers of wireless telecommunication services using a voice mail system. In a first aspect of the invention, a billing center for collecting and maintaining billing information that contains detailed information on calls made by the subscriber is linked to the voice mail system operating together with a wireless telecommunication network. A computer recalls the billing information from the billing center for a selected subscriber and generates a bill in a format compatible for storage in the voice mail system. The format of the bill may be a synthesized voice message verbally describing the bill specifics or it can be a computer readable file containing comprehensive billing information. The generated bill is then stored in the subscriber's voice mailbox. Notification indicating that the bill has been delivered to the subscriber's voice mailbox sent, for example, by flashing an indicator on the subscriber's phone or by sending an short message service (SMS) message. The bill can then be retrieved by accessing the subscriber's voice mailbox with a phone to listen to the voice bill or it can be downloaded by a computer if it is a computer readable file.

In another aspect of the invention, a bill is generated from billing information acquired from the billing center on a selected subscriber which is then transmitted for storage to a remote voice mail system that may be operating together with a private branch exchange (PBX), for example. The technique is especially suitable for delivering bills to selected subscribers without disturbing the subscriber's current activity. This allows bills to be delivered in the "background" during low traffic and tariff periods for improved convenience and resource efficiency.

The invention permits an automated method of delivery of bills incurred by wireless subscribers in a cost effective and timely manner. The reliance on a third party for bill delivery is eliminated thereby saving the expense and time associated with traditional postal delivery. Furthermore, subscribers are able to gain access to their bills from any location and can optionally download computer readable files for analysis at their convenience. These and other advantages of the present invention will become apparent upon reading the following detailed description and studying the various figures of the drawings.

BRIEF DESCRIPTION OF THE DRAWINGS

The invention, together with further objects and advantages thereof, may best be understood by reference to the following description taken in conjunction with the accompanying drawings in which:

FIG. 2 is a flow diagram illustrating the functional steps in accordance with a second embodiment.

DETAILED DESCRIPTION OF THE PREFERRED EMBODIMENTS

Voice mail systems for use with wireless telecommunication networks have existed for some time and is typically offered as part of a standard service package or sold as an additional service with subscriber accounts. A typical use of voice mail includes storing and forwarding of messages made by a calling party when the subscriber is unreachable, for example, when his/her phone is busy or is switched off. Retrieval of messages by the subscriber is generally accomplished by accessing the voice mail system by performing an authentication action in order to verify that the user is the authorized subscriber such as entering a PIN code for example. The voice mail message delivery system already in use in many wireless telecommunication networks may be adapted to deliver to subscribers other types of information such as a bill for services in a cost effective and efficient basis as compared to those sent through the post.

Figure 1A:
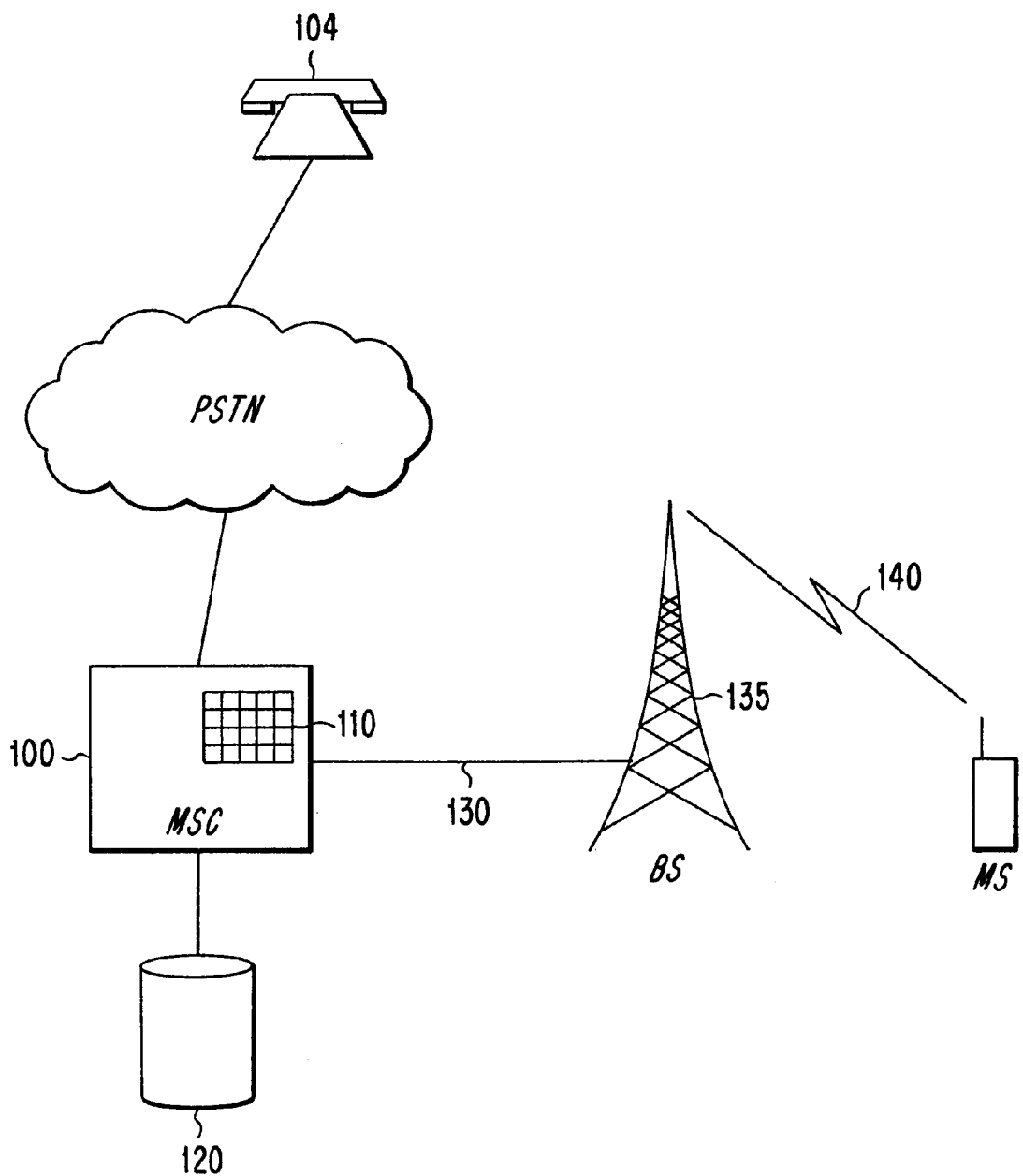
FIG. 1a is an exemplary simplified wireless telecommunication network and voice mail billing delivery system operating in accordance with the present invention.

FIG. 1a illustrates an exemplary simplified wireless telecommunication network comprising a voice mail billing delivery system operating in accordance with the present invention. A mobile switching center (MSC) 100 is linked to the public switched telephone network (PSTN) such that subscribers of the wireless network can be accessed by any standard telephone 104, for example. Contained within the MSC 100 is a store-and-forward type voice mail system 110 used to store messages for individual subscribers for subsequent retrieval. The MSC 100 is further coupled to a billing center 120 that records and maintains comprehensive billing information on calls made by individual subscribers.

In accordance with a first embodiment of the present invention, a billing delivery system using the voice mail system is described. In an exemplary procedure, a billing record for a particular subscriber is recalled from the billing center 120 by a processing unit (not shown) for processing. The processing unit may be a separate device or may be contained in either the MSC 100 or billing center 120. The processing unit processes the billing information and translates it into the form of a digitally synthesized voice message. As known by those skilled in the art, there exists satisfactory speech synthesis equipment that allow computers to generate realistic sounding speech. This technology, for example, is already in use at banks where customers can check their account information via the telephone by listening to a computer generated voice. In accordance with the embodiment, a voice bill message may be generated such as, "The account balance for your bill for the service period of May 28th to Jun. 27th 1998 is $ 52.35" which is then sent to the appropriate subscriber's voice mailbox. The subscriber can be alerted that a voice mail message is waiting in the customary fashion that they are familiar with, for example, the notification may include a flashing indicator, or a short message service (SMS) message displayed on the mobile station (MS). The subscriber may then access the bill by retrieving messages from their voice mailbox in the normal fashion, for example, by accessing the voice mail system over air interface 140 via base station 135 (BS) and link 130. An acknowledgement that the subscriber has received the voice mail bill may be indicated in the billing service center 120.

Figure 1B:
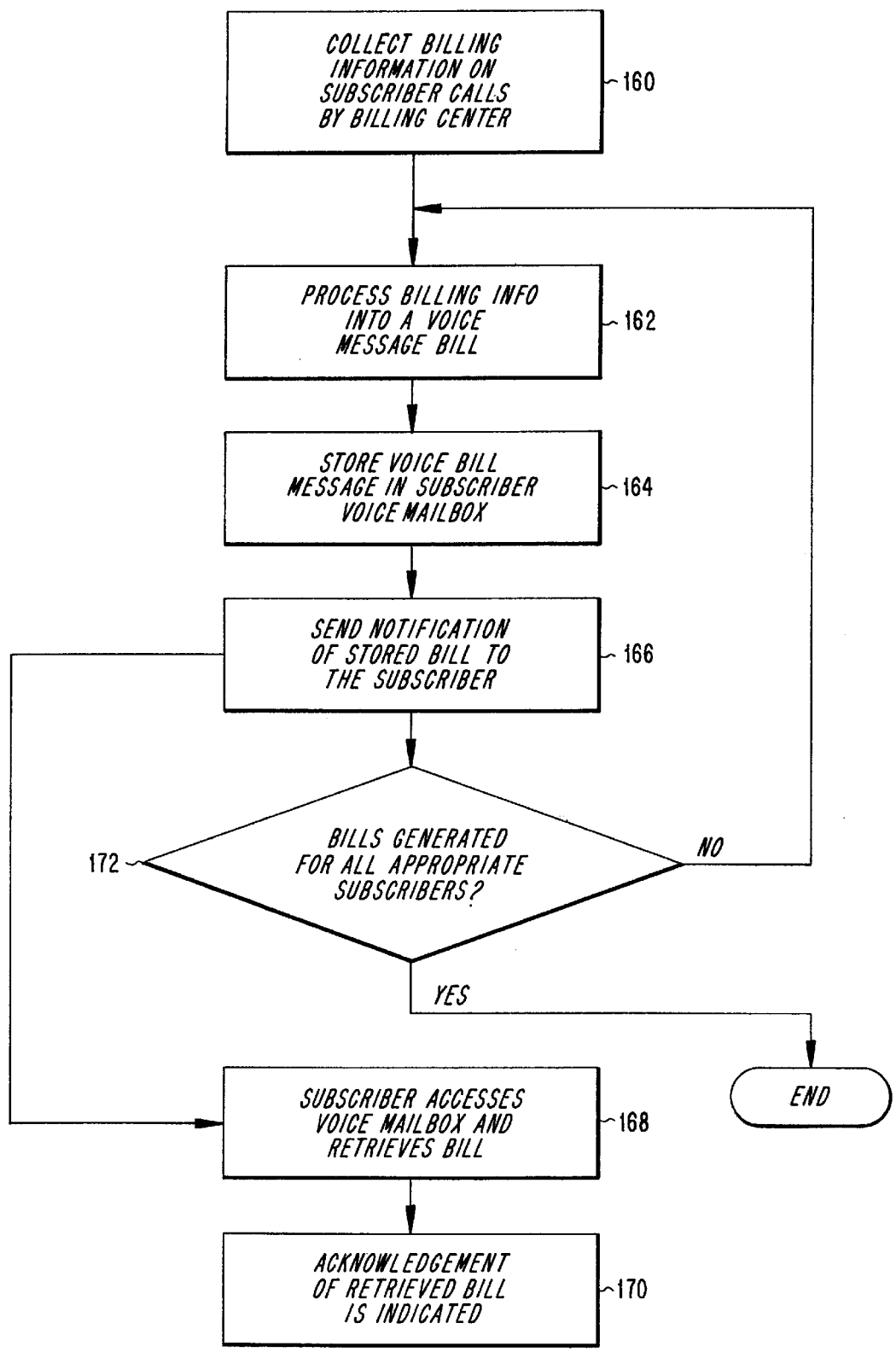
FIG. 1b is a flow diagram illustrating the functional steps in accordance with a first embodiment.

FIG. 1b shows a flow diagram illustrating the functional steps in accordance with the first embodiment. At step 160, the billing center 120 collects and maintains billing information regarding individual calls for each subscriber. At step 162, the billing information for a specific subscriber is processed into a synthesized voice message bill. At step 164, the voice message bill is stored in the subscriber's voice mailbox (110 of FIG. 1). At step 166, notification of the delivered bill is sent to the subscriber by, for example, displaying the voice mail indicator on the MS, as it normally occurs with the arrival of any voice mail. Alternatively, an SMS message indicating delivery may be displayed on the user's MS when operating in a mobile network. Other notification means are possible such as a special dial tone when retrieving messages from a fixed network phone, for example. At step 168, the subscriber accesses the voice mailbox in the conventional manner and retrieves the voice message bill. From the user's perspective, retrieving a voice message bill is no different from retrieving their normal voice mail messages. The voice message bill may be listened to from any phone and can be salved for future play back. When the subscriber has successfully retrieved the bill, an acknowledgment may be indicated, at step 170, in the billing service center 120 for use by the Account Manager of the network provider. At step 172, the system checks to determine if all the appropriate bills have been generated, and if not, the process repeats by returning to step 162 until all have been completed.

In a second embodiment of the present invention, instead of a synthesized voice bill message, the billing information is translated to a computer readable file that can be stored in the voice mail system. By way of example, in the early days of computer storage, digital data such as software was converted for storage on audio media such as magnetic tapes. Likewise, the subscriber's bill can be processed into a similar format for storage in the voice mailbox which can be subsequently retrieved by a computer. Retrieval by computer yields a number of advantages for the subscriber such as the ability to analyze large amounts of data by importation into a post-processing program such as a spread sheet, for example.

FIG. 2 shows a flow diagram illustrating the functional steps in accordance with the second embodiment. At step 200, subscriber billing information is collected and maintained by billing center 120. At step 204, the billing information is translated into a computer readable format that is capable of being stored in the voice mail system. At step 206, the computer readable bill is stored in the appropriate subscriber's voice mailbox wherein a notification of that event (step 208) is sent to the subscriber via any number of notification means as previously described. Following notification and upon accessing the voice mailbox by the subscriber, a short message may follow indicating that a computer readable bill message follows. In step 210, the subscriber can then download the bill by accessing the mailbox with a computer configured to receive said file. Alternatively, the subscriber can access the mailbox with the computer by using either a wireline or wireless modem. The computer may then import the bill into a program for detailed analysis in, for example, a spreadsheet. In step 212, an acknowledgment is indicated to the network provider that the bill has been retrieved by the subscriber. At step 214, the process is repeated until all appropriate bills have been generated and stored in their respective voice mailboxes.

In a third embodiment of the invention, automated bill delivery is performed by dialing directly to access a remote voice mail system not associated with the wireless network. This permits the bills to get to the subscribers in the most convenient way. By way of example, the method is especially suitable for use with private branch exchanges (PBX's) such as those in use for company communications. For example, a voice mail bill may be conveniently left for a subscriber at their workplace if so desired. Additionally, if the subscriber requests, the voice mail bill may be sent to the subscriber's home answering machine. When accessing a PBX, the comprehensive billing information can be conveniently delivered to a specific mailbox during late night hours when the networks are less busy and when phone tariffs are typically lower. Thus large numbers of billing messages can be left quickly and efficiently during after-work hours that will be available for retrieval the next morning.

Figure 3:
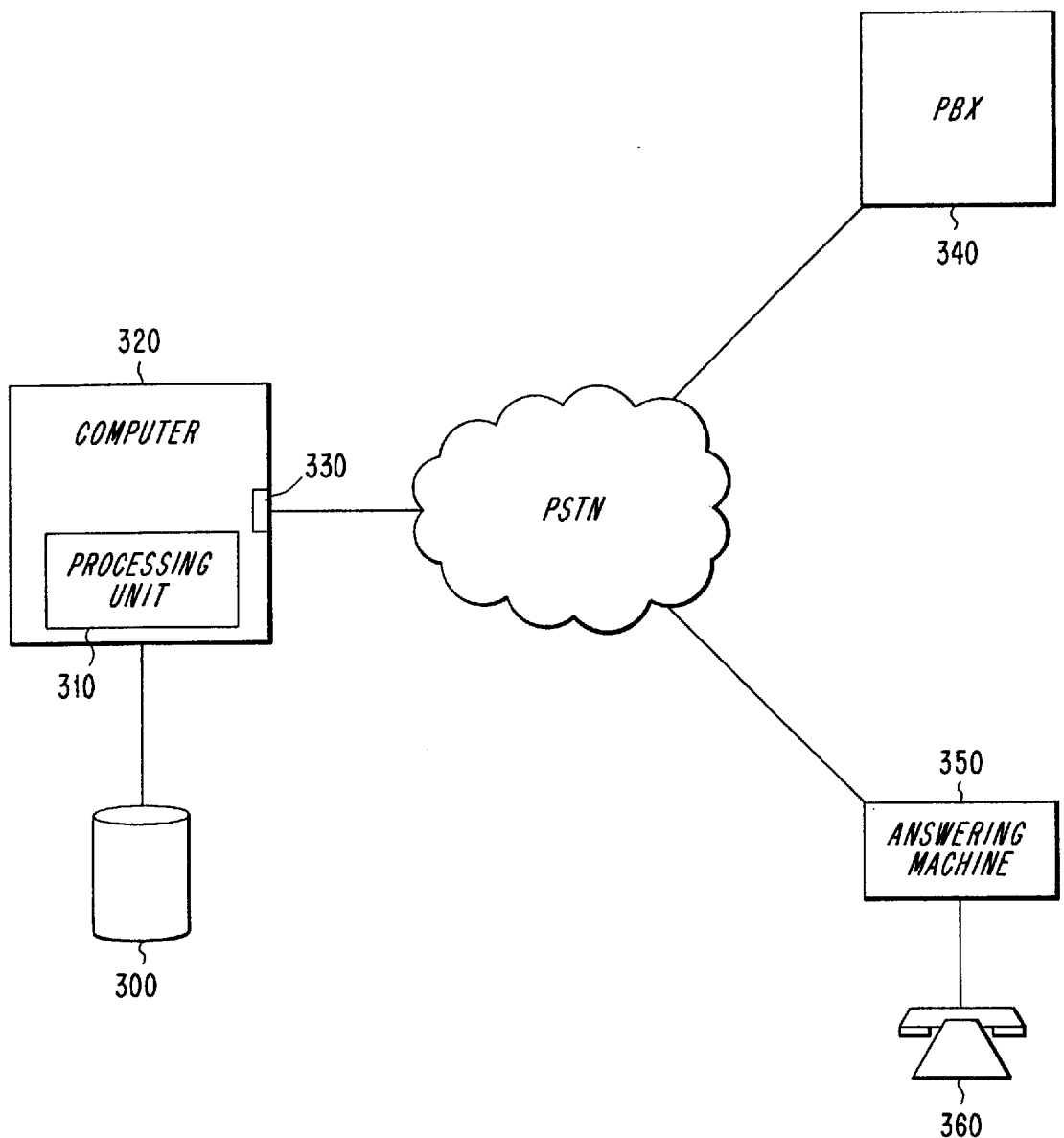
FIG. 3 is an exemplary depiction of an alternate concept operating in accordance with a third embodiment.

FIG. 3 is an exemplary illustration of the delivery concept in accordance with the third embodiment. A billing center 300 containing detailed information on calls made by mobile subscribers is linked to processing unit 310 for generating a synthesized voice bill or computer readable bill from the detailed information. The processing unit 310 may be incorporated within an MSC of a wireless network or a stand-alone computer 320 with, for example, a standard modem connection to the PSTN as indicated by reference numeral 330. To deliver a bill to a selected subscriber at work for example, a dialed connection is made to a specific mailbox within a company PBS system 340. For other subscribers, it may be more convenient to dial directly in order to deliver the bill to the subscriber's home answering machine 350 in which the bill can later be retrieved via a connected phone 360. Dialing to answering machine 350 may occur to any location where the subscribers may wish to receive their bill such as when they are on vacation or visiting relatives, for example. The transmission of bills to the PBS's may be programmed to occur in the nighttime hours during periods of low traffic and tariffs for delivery that is efficient and resource efficient.

The present invention contemplates a bill delivery technique for use with presently existing voice mail services. The technique permits the automated delivery of bills incurred by wireless subscribers in a cost effective and timely manner. A further benefit includes the ability for subscribers to access their bills regardless of location by listening to or downloading their bill at their convenience. Moreover, the reliance on a third party for bill delivery is eliminated thereby saving expense and time associated with its delivery.

It will be appreciated by those skilled in the art that changes could be made to the embodiments described above without departing from the broad inventive concept thereof. It should be understood that the invention is not limited to the particular embodiments disclosed, but it is intended to cover modifications within the spirit and scope of the invention as defined in the appended claims.

What is claimed is:

1. A method of delivering a bill to a subscriber of a wireless telecommunication network using a voice mail system comprising the steps of:

collecting billing information by a billing center linked to said network and wherein said billing information includes detailed information on calls made by said subscriber;

processing said billing information into a bill that is in a compatible format for storage in said associated voice mailbox;

storing said bill in a voice mailbox associated with said subscriber within said voice mail system;

notifying said subscriber of said stored bill;

accessing said voice mailbox by said subscriber; and retrieving said bill from said voice mailbox.

2. A method according to claim 1 wherein said processing step includes translating said billing information into a voice message bill.

3. A method according to claim 2 wherein said retrieving step includes accessing said mailbox from a phone by listening to said voice message bill.

4. A method according to claim 1 wherein said processing step includes translating said billing information into a bill that is a computer readable file.

5. A method according to claim 4 wherein said retrieving step includes accessing said mailbox with computer and downloading said computer readable file.

6. A method according to claim 1 wherein said storing step is performed by dialing to the destination with a standard modem.

7. A method according to claim 1 wherein said notifying step includes displaying an voice mail indicator symbol on the subscriber's mobile station.

8. A method according to claim 1 wherein said notifying step includes sending an short message service message for display on the subscriber's mobile station.

9. A method according to claim 1 wherein said voice mail system is incorporated for use with said wireless telecommunication network.

10. A method according to claim 1 wherein said voice mail system is incorporated for use with a remote private branch exchange (PBX).

11. A method according to claim 10 wherein said storing step includes dialing directly to a selected mailbox within said voice mail system.

12. A method according to claim 1 wherein an acknowledgment of the retrieved bill is indicated in the billing center.

13. A system in wireless telecommunication network for delivering bills to a subscriber for wireless telecommunication services for subsequent retrieval by said subscriber, said system comprising:

a billing center linked to said wireless telecommunication network for collecting billing information associated with the calling activity of said subscriber;

a voice mail system comprising a plurality of voice mailboxes each being associated with an individual subscriber; and means for translating said billing information into a bill that is compatible for storage in the voice mail system;

wherein said translated bill is stored in a voice mailbox associated with said subscriber and wherein the subscriber retrieves said bill by accessing said voice mailbox.

14. A system according to claim 13 wherein said voice mail system is incorporated for use with said wireless telecommunication network.

15. A system according to claim 13 wherein said voice mail system is incorporated for use with a remote PBX.

16. A system according to claim 13 wherein said means for translating said billing information includes a computer.

17. A system according to claim 13 wherein said translated bill is in the form of a voice message bill.

18. A system according to claim 17 wherein said stored bill is retrieved by accessing the subscriber's voice mailbox with a phone.

19. A system according to claim 13 wherein said translated bill is in a digital computer readable file.

20. A system according to claim 19 wherein said stored bill is retried by accessing the subscriber's voice mailbox with a computer.

* * * * *